United States Patent [19]

McCarthy

[11] 4,089,788

[45] May 16, 1978

[54] METHOD FOR IMPROVING CALCIUM ION TOLERANCE OF HYDROCARBON POLYMER SULFONATE SURFACTANTS USED IN ENHANCED RECOVERY PROCESSING IN SUBTERRANEAN OIL-BEARING FORMATIONS

[75] Inventor: Edward F. McCarthy, Naperville, Ill.

[73] Assignee: Standard Oil Company (Indiana), Chicago, Ill.

[21] Appl. No.: 699,695

[22] Filed: Jun. 25, 1976

[51] Int. Cl.$^2$ ............................................. E21B 43/22
[52] U.S. Cl. ................................. 252/8.55 D; 166/275; 260/513 R
[58] Field of Search .................. 252/8.55 D, 554, 555; 260/513 B, 513 T

[56] References Cited

U.S. PATENT DOCUMENTS

| | | | |
|---|---|---|---|
| 2,653,970 | 9/1953 | Fessler | 260/513 B |
| 3,424,693 | 1/1969 | Stein et al. | 260/513 R X |
| 3,428,654 | 2/1969 | Rubinfeld et al. | 252/555 X |
| 3,535,339 | 10/1970 | Beyer et al. | 260/513 T X |
| 3,644,499 | 2/1972 | Murphy et al. | 260/513 B |
| 3,714,062 | 1/1973 | Askew et al. | 252/308 |
| 3,954,849 | 5/1976 | Karll et al. | 260/513 T X |

Primary Examiner—Herbert B. Guynn
Attorney, Agent, or Firm—Mark Di Pietro; Arthur G. Gilkes; William T. McClain

[57] ABSTRACT

A method for increasing the tolerance of hydrocarbon polymer sulfonate surfactant materials to divalent ions especially calcium when such materials are injected into subterranean formations containing high divalent cation contents which comprises contacting the hydrocarbon polymer sulfonate surfactant with an oxidizing agent at oxidizing conditions. The specific hydrocarbon polymer sulfonate surfactants disclosed are those produced from lower aliphatic olefins such as isobutylene, butene-1, butene-2 or propylene or other similar olefinic materials which have been polymerized to average equivalent molecular weights of from about 350 to 675 or higher. The preferred oxidizing agent is hydrogen peroxide.

17 Claims, No Drawings

METHOD FOR IMPROVING CALCIUM ION TOLERANCE OF HYDROCARBON POLYMER SULFONATE SURFACTANTS USED IN ENHANCED RECOVERY PROCESSING IN SUBTERRANEAN OIL-BEARING FORMATIONS

BACKGROUND OF THE INVENTION

1. Field of the Invention

The field of art to which this invention pertains is chemicals for use in enhanced recovery of crude oils from subterranean formations. The present invention resides in a specific method of treatment of a hydrocarbon polymer sulfonate so as to render that material more tolerant of divalent cations especially calcium when injected into a subterranean formation by reducing precipitation of materials caused by reactions with divalent ions present in the connate water in the formation.

2. Description of the Prior Art

There is much prior art relating to the use of polymer sulfonate as surfactants in enhanced recovery operations where crude oil is recovered from subterranean formations. U.S. Pat. No. 3,714,062, issued Jan. 30, 1973, and having as inventors Warren S. Askew and H. R. Froning relates to branched chain sulfonates for use in solubilized oil-water solutions for miscible water flooding. Specifically a solubilized oil-water mixture of a polymer sulfonate is mixed with cosurfactant and brine and injected into a subterranean formation. Enhanced recovery of crude oil present in the formation occurs. Normally this crude is not recovered when using straight water flooding techniques. This patent however does not recognize the problem associated with certain branched chain sulfonates in that precipitation of materials occurs when such sulfonate materials are contacted with reservoir systems which contain connate water having high concentrations of divalent ions, especially calcium. This phenomenon occurs even though the surfactant and crude give miscible mixtures.

Other patents which may be of interest in this area include U.S. Pat. No. 2,160,343 issued in 1939 and U.S. Pat. No. 3,506,070 issued in 1970.

Relevant classes which may be of interest for obtaining other art include U.S. Class 252-308, U.S. Class 252-353 and U.S. Class 166-273.

SUMMARY

The present method of treatment of a hydrocarbon polymer sulfonate relates to reducing or eliminating the amount of precipitated materials formed when it is injected into a subterranean formation having high divalent ion contents, especially calcium.

When injecting the sulfonate surfactants described herein into a formation, large quantities of calcium ions will cause precipitation to occur with some of the inorganic sulfite materials which are inherently present in such surfactants. The precipitate can partially or fully plug the faces of the subterranean reservoir reducing or stopping permeation of enhanced recovery materials into the formation.

In order to allow producers of crude to fully recover residual amounts of crude oil remaining in subterranean formations after normal water flooding operations have occurred, it is important to prevent the formation of the above described precipitate.

In summary, the present invention relates to contacting a hydrocarbon polymer sulfonate surfactant material with an oxidizing agent specifically preferred to be hydrogen peroxide, to oxidize certain of the materials present in the surfactant reducing or preventing the pecipitation of insoluble materials when the surfactant is mixed with high calcium containing brines.

DESCRIPTION OF THE PREFERRED EMBODIMENTS

In a broad embodiment this invention relates to a method for improving the tolerance of surfactants comprising aliphatic hydrocarbon polymer sulfonates having an average equivalent molecular weight from about 250 to about 675 to calcium cation containing brines which method comprises contacting said surfactant with an oxidizing agent as conditions to effect oxidation of sodium sulfite contained in said surfactant.

Another embodiment of the present invention relates to a method for improving the tolerance of surfactants comprising aliphatic hydrocarbon polymer sulfonates having an average equivalent molecular weight ranging from about 350 to about 675 to calcium cation containing brines where said surfactant is in a solubilized oil-water mixture also comprising: (a) a cosurfactant selected from the group consisting of water-soluble alcohol, oil-soluble alcohol having no more than 10 carbon atoms, and a 2 to 12 mole ethylene oxide adduct of an alcohol having from 4 to 10 carbon atoms or mixtures thereof, the weight ratio of sulfonate to cosurfactant being from about 1:5 to about 10:1; and (b) water; the improvement comprising contacting the surfactant with an oxidizing agent at conditions to effect oxidation of a portion of the surfactant.

A more specific embodiment of my invention resides in a method of flooding an oil-bearing subterranean formation with a solubilized oil-water mixture which is injected into the formation and displaced towards at least one production means wherein the mixture comprises: from about 2 to about 50 weight percent of a surfactant comprising an aliphatic hydrocarbon polymer sulfonate having an average equivalent molecular weight of from about 250 to about 675; a cosurfactant selected from the group consisting of water-soluble alcohol, oil-soluble alcohol having no more than 10 carbon atoms and 2 to 12 mole ethylene mole adduct of an alcohol having from 4 to 10 carbon atoms or mixtures thereof, the weight ratio of cosurfactant to sulfonate ranging from about 1:5 to about 10:1; and from about 98 to about 50 weight percent of an aqueous sodium chloride containing brine solution; wherein the improvement increases the tolerance of said surfactant to calcium containing brines and comprises contacting said surfactant with an oxidizing agent at oxidizing conditions to effect oxidizing of a portion of the surfactant.

These and other embodiments and objects of the invention will be ascertained after a more thorough review of the following specification, examples and claims.

The hydrocarbon polymer sulfonate sufactants treated by the invention include those generally characterized as aliphatic hydrocarbon polymer sulfonates which contain in their backbone essentially aliphatic hydrocarbon chains. The hydrocarbon polymer sulfonate surfactants are produced by first polymerizing mixtures of unsaturated lower aliphatic monomers at conditions to produce a viscous polymer which is readily sulfonated and neutralized. The polymer may be produced from the cationic polymerization of propylene to form a propene polymer of the polymerization of a single monomer from the group of butene-1, butene-2, isobutylene or mixtures thereof. The polymerization of the butene materials will produce a polybutene polymer which also can be sulfonated. Other monomers or mixtures of monomers may be used.

After polymerization forming a suitable viscous polymer, the material can then be sulfonated preferably with gaseous $SO_3$ to produce a sulfonated product. Most typically, the sulfonation occurs at the unsaturated portion of the produced polymer since most of the polymers produced contain for each polymer molecule at least one olefinic bond.

Sulfonation is relatively well known in the art and can include recycle of off gas from a $SO_3$ sulfonation unit. The sulfonated product which is in the form of polymer sulfonic acid is then neutralized with any of the well known bases preferably using such materials as sodium hydroxide or ammonium hydroxide although other materials may be used. The neutralized product for the most part will contain roughly from about 10 to about 15 weight percent of unreacted polymer generally characterized as oil, from about 40 to about 60 percent of the hydrocarbon polymer sulfonate itself including in some cases unhydrolyzed sultone materials, from about 5 to about 20 percent by weight inorganic salts, the remaining material generally comprising water either as a result of processing or dilution. Depending upon how the above sulfonated product is to be used, it may also be mixed with cosurfactant materials including 6 mol ethoxylated hexanols or other similar materials in proportions which will depend on the reservoir conditions including its permeability, the properties of the crude and temperatures of operation in the reservoir. In many instances, depending on the specific cosurfactant used, the weight ratio of the above surfactant (on a 50 percent active sulfonate basis) would generally be from about one part of the hydrocarbon polymer sulfonate surfactant per part of cosurfactant to 20 more parts of the hydrocarbon polymer sulfonate surfactant per part of cosurfactant.

Appropriate selection of a viscous polymer feedstock for sulfonation can be made to produce a neutralized sulfonate having an average equivalent molecular weight in the range of from about 250 to about 675. Preferably the sulfonate should have an average equivalent molecular weight in the range of from about 350 to about 575 and more specifically in the range of from about 400 to about 450.

Equivalent molecular weight refers to the molecular weight of the product per each mole of sulfonate.

For simplicity of definition the term "hydrocarbon polymer sulfonate" will generally include the polymer material which has been sulfonated and neutralized while the term "surfactant" will generally include other materials as described above for the neutralized product including hydrocarbon oils (generally unsulfonated polymer), unhydrolyzed sultones, inorganic salts and water.

In some cases "surfactant" may be produced by purification of the neutralized sulfonation product to eliminate some of the undesirable materials. The purification can take place by extraction to separate the oil-insoluble and oil-soluble portions of the product.

The quantity of surfactant used in the mixture which injected into the formation will vary depending on the specific type of reservoir into which it is placed. Specifically, it is desired to use surfactant concentrations of anywhere from a few to about 50 (based on 50 percent active polymer sulfonate in the surfactant) percent by weight or more in brine. It is preferred to use surfactant concentration in brine for injection into formations anywhere from about 5 to about 20 weight percent. An especially preferred formulation is a 12 to 16 weight percent concentration of a surfactant, which itself contains preferably about 50 weight percent polymer sulfonate, in brine. A cosurfactant may also be mixed with the mixture injected into the formation. A preferrable source of water for injection is the connate water found in the reservoir.

In order to obtain a more detailed understanding of the particular types of hydrocarbon polymer sulfonates available, how they are used and the specific methods of production, U.S. Pat. No. 3,714,062 patented Jan. 30, 1973 is hereby incorporated by reference into this specification. Such patent has as its inventors Warren S. Askew and H. R. Froning was filed Aug. 8, 1969 as U.S. Ser. No. 848,748 and is assigned to Amoco Production Company, Tulsa, Okla.

An abstract of the referenced patent follows: Solubilized oil-water solutions of high water content and resistant to calcium and magnesium ions are prepared by mixing a solution of an alkali metal aliphatic hydrocarbon polymer sulfonate having an average molecular weight from about 350 to about 675 with a cosurfactant or coupling agent which may be a water-soluble alcohol, an oil-soluble alcohol having not more than 10 carbon atoms, or an ethylene oxide adduct of an alcohol having from 4 to 10 carbon atoms. These solutions are useful as oil solvents in miscible water flooding and can also be employed as solvents in water injection well cleanout procedures.

The invention of the referenced patent can be summarized as a solubilized oil-water soluble solution which comprises a specific alkali metal straight chain hydrocarbon polymer, a cosurfactant, a hydrocarbon oil and an aqueous brine containing up to about 55,000 parts per million of a salt of a monovalent cation.

The broadest claim of the referenced patent follows: A solubilized oil-water solution comprising essentially an alkali metal straight chain hydrocarbon polymer sulfonate having an average molecular weight ranging from about 350 to about 675, a cosurfactant selected from the group consisting of a water-soluble alcohol, an oil-soluble alcohol having no more than 10 carbon atoms and a 2 to 12 mole ethylene oxide adduct of an alcohol having from 4 to 10 carbon atoms, the ratio of said sulfonate to cosurfactant ranging from about 1:5 to about 10:1, the combination of sulfonate and cosurfactant being present in a concentration ranging from about 3 to about 30 weight percent, from 1 to about 50 weight percent of a hydrocarbon oil, and from about 20 to about 96 weight percent of an aqueous brine containing up to about 55,000 ppm of a salt of a monovalent cation.

Hydrocarbon polymer sulfonate surfactants themselves as indicated in the referenced patent do for the most part exhibit relatively good tolerances to divalent cations in connate waters in subterranean reservoirs in the sense of maintaining good oil-water miscibility. The specific chemical make-up and nature of these materials is attributed to this reasonably good tolerance. However during the methods of manufacture of these materials quantities of inorganic salts are produced and end up as part of the surfactant material. The inorganic salt portion of this surfactant includes various identified and unidentified materials. The predominantly identifiable materials are sodium sulfate and sodium sulfite among others. This is especially true when sodium is present as a result of sodium hydroxide neutralization.

The sodium sulfite in the surfactant when contacted with divalent cations, in particular calcium, forms very insoluble calcium sulfite readily precipitating out of the mixture. This precipitate can cause plugging of the face of the portion of the reservoir into which injection is occurring generally preventing or severely handicapping subsequent attempts at surfactant injection into the formation. This can result in losses of valuable residual crude oils left trapped in the subterranean reservoir.

By eliminating substantially all or most of the sodium sulfite material it is possible to eliminate the formation of the precipitate when calcium containing brines are diluted or contacted with the specified surfactant.

Therefore, in order to achieve such a reduction of sulfite ion and in particular sodium sulfite it is proposed that an oxidation treatment be used to convert the sodium sulfite to sodium sulfate. It is particularly favorable when choosing oxidation reagents to oxidize the sodium sulfite or ammonium sulfite (if ammonium hydroxide is used in neutralization) to use hydrogen peroxide, since one of its products of reaction is water which produces no detrimental effects on the ultimate treated product. It is possible, however in certain instances to use other oxidation materials such as molecular oxygen.

The oxidation reaction preferably should occur with hydrogen peroxide wherein the hydrogen peroxide is either bubbled through a solution of the surfactant or mixed with water and contacted at oxidation conditions with the surfactant mixture. The oxidation treatment may take place with or without cosurfactant having been added to the surfactant material. We have found for ease of processibility that the entire neutralization effluent (surfactant) can be treated with an aqueous mixture of hydrogen peroxide at reaction conditions to form a favorable oxidation of the sodium sulfite to sodium sulfate and thereafter the treated surfactant can then be used in the field.

Specifically hydrogen peroxide can be added in a dilute solution of anywhere from a few to 50 or more percent by weight of hydrogen peroxide. Preferred solutions are about a 3.4 to 34 weight percent solution in water of hydrogen peroxide. This aqueous hydrogen peroxide mixture can be comingled with the surfactant at reaction temperatures which will include temperatures anywhere in the range of about 70° to about 200° F and more preferably from around 130° to about 160° F for a period of from a few seconds to a few hours for most of the reaction to occur. Reaction conditions can be performed at ambient pressures. In many instances it is preferred to gently agitate or mix the aqueous solution of hydrogen peroxide and the sulfonate containing material.

The surfactant may contain anywhere from about 5 to about 20 weight percent of inorganic salt. This inorganic salt may contain from a few up to 100 percent sulfite material which is to be oxidized in order or reduce its concentration. A surfactant containing as much as 4 weight percent of sodium sulfite after suitable treatment with hydrogen peroxide at oxidation conditions may only contain from 2 to a few tenths of a weight percent of sulfite.

It has been found that enhanced oxidation will occur when either the surfactant itself or the hydrogen peroxide material is fairly well diluted. In instances in which a surfactant which contained 50 weight percent of hydrocarbon polymer sulfonate is diluted with water to a concentration of about 20 percent of the hydrocarbon polymer sulfonate and treated with a slight stoicheometric excess of a hydrogen peroxide aqueous solution almost 90 percent of the sulfite present originally in the surfactant is converted.

The following examples are presented as specific embodiments of this invention and are not intended to unduly limit the scope of the claims attached.

EXAMPLE I

In this example a solubilized oil-water mixture was mixed with two brines having varying calcium ion contents to illustrate the problems associated with the use of certain sulfonate surfactants in such brines.

Brine "A" was prepared as a 1 normal solution of NaCl and 5,000 ppm by weight calcium ion. A second brine "B" was prepared as a solution of 1 normal solution of NaCl and 2,500 ppm by weight of calcium ion. Each of these brines was mixed with a surfactant mixture to make up a 12 weight percent solution of the surfactant in brine. The surfactant in each case contained a hydrocarbon polymer sulfonate described below and a cosurfactant (6 mole ethoxylated hexanol) in a weight ratio of 5:1 hydrocarbon polymer sulfonate to cosurfactant.

The surfactant material containing the hydrocarbon polymer sulfonate had the following general composition:

Table I

|  |  |
|---|---|
| Oil | 12.0 weight percent |
| Sultone | 1.5 weight percent |
| Hydrocarbon Polymer Sulfonate | 50.0 weight percent |
| Inorganic Salt | 12.5 weight percent |
| Water | 24.0 weight percent |

The polymer sulfonate was produced by sulfonation with gaseous $SO_3$ a polymer produced from polymerization of a mixture of isobutylene, butene-1 and butene-2. The sulfonated polymer was then neutralized with sodium hydroxide. The entire neutralized product is represented by Table I above. The hydrocarbon polymer sulfonate had an average equivalent molecular weight of from about 400 to about 450 with its range of equivalent molecular weights from 200 to about 1,000.

The mixtures of surfactant mixture and brines "A" and "B" above were each allowed to stand for 5 days at room temperature at which time a white insoluble precipitate dropped out. The precipitates were filtered out, dried and weighed. The precipitate from brine "A" was 4326 ppm by weight of the solution while that from brine "B" was found to be 2272 ppm.

The precipitate was of such a character that if it was present in a surfactant slug used in enhanced recovery techniques where high calcium ion concentrations are present that face plugging of the formation would likely occur. This problem would probably be of a more severe nature in low permeability reservoirs.

EXAMPLE II

In this example the surfactant described in Table I above was treated with hydrogen peroxide at a level of 0.3 grams $H_2O_2$ per 100 grams of the surfactant. The peroxide was added as a 3.4 weight percent solution in water to the polymer sulfonate material for 30–60 minutes at a temperature of 130°–160° F. The treated product was then allowed to cool and the mixed in a 5.5:1 weight ratio with the cosurfactant described in Example I. A 12.6 weight percent solutions of the surfactant in brines "A" and "B" were made up and the material was allowed to stand at room temperature for 5 days.

After five days the insoluble precipitates were measured as 676 ppm for brine "A" and 600 ppm for brine "B."

EXAMPLE III

In this example the surfactant described in Table I above was treated with hydrogen peroxide at 1.5 grams $H_2O_2$ per 100 grams of the surfactant using a 3.4 weight percent solution of $H_2O_2$. The treated product was then mixed in a weight ratio of 7.5:1 of surfactant to cosurfactant with the cosurfactant described in Example I. The resulting material was made up to 15 weight percent solutions of surfactant in brines "A" and "B." After aging at room temperature for 5 days brine "A" showed 300 ppm precipitates while brine "B" showed no measureable precipitation products.

EXAMPLE IV

This example illustrates that dilution of the surfactant or hydrogen peroxide with water causes a higher conversion of the sulfite contaminants in the surfactant.

A surfactant described in Table I above was treated with a 10 percent stoicheometric excess of a 34 percent hydrogen peroxide solution. Sixty-two percent of the sulfite present in the sulfonate was converted.

Similar treatments except with a 100 percent stoichiometric excess of hydrogen peroxide yielded a 72 percent conversion of sulfite.

The surfactant described in Table I above was diluted to a 20 percent solution by addition of distilled water. The resultant mixture was treated with a 10 percent stoichiometric excess of a 34 percent hydrogen peroxide solution. Eighty-six percent of the sulfite was found to have been converted.

EXAMPLE V

The surfactant described in Table I above was treated with a 34 weight percent solution of hydrogen peroxide at 750 percent stoichiometric excess. The treated product was stripped back to the original weight of surfactant.

Comparisons of this treated material with similar but untreated material indicated that there was no difference in viscosity and performance of each when observed in vial testing to determine crude oil solubility of the surfactant.

I claim as my invention:

1. In a method of flooding an oil-bearing subterranean formation with a solubilized oil-water mixture which is injected into the formation and displaced towards at least one production means wherein the mixture comprises: from about 2 to about 50 weight percent of a surfactant comprising an aliphatic hydrocarbon polymer sulfonate having an average equivalent molecular weight of from about 250 to about 675 and containing a sulfite salt; a cosurfactant selected from the group consisting of water-soluble alcohol, oil-soluble alcohol having no more than 10 carbon atoms and a 2 to 12 mole ethylene oxide adduct of an alcohol having from 4 to 10 carbon atoms or mixtures thereof, the weight ratio of cosurfactant to sulfonate ranging from about 1:5 to about 10:1; and from about 98 to about 50 weight percent of an aqueous sodium chloride containing brine solution; wherein the improvement increases the tolerance of said surfactant to calcium cation containing brines and comprises contacting said sulfonate with hydrogen peroxide at oxidation conditions to effect oxidation of the sulfite in the surfactant.

2. The method of claim 1 further characterized in that said polymer sulfonate is selected from the group consisting of alkali metal or ammonium or mixtures thereof sulfonates.

3. The method of claim 2 further characterized in that the polymer sulfonate has an average equivalent molecular wieght of from about 400 to about 450 and the hydrocarbon portion of the sulfonate is derived from the polymerization of monomers selected from the group consisting of isobutylene, butene-1, butene-2, or propylene or mixtures thereof.

4. The method of claim 2 further characterized in that the hydrocarbon portion of the sulfonate is derived from the polymerization of a mixture comprising isobutylene, butene-1, and butene-2.

5. The method of claim 1 further characterized in that said polymer sulfonate has an average equivalent molecular weight of from about 350–575 with its hydrocarbon portion derived from the polymerization of a mixture comprising isobutylene, butene-1 and butene-2.

6. The method of claim 5 further characterized in that said sulfonate is selected from the group consisting of alkali, metal or ammonium sulfonates or mixtures thereof.

7. The method of claim 6 further characterized in that said surfactant comprises from about 8 to about 13 weight percent hydrocarbon oil, from about 47 to about 52 weight percent sulfonate, from about 23 to about 29 weight percent water and less than about 16 weight percent inorganic salts.

8. The method of claim 7 further characterized in that said surfactant constitutes from about 6 weight percent to about 12 weight percent of the solubilized oil-water mixture.

9. The method of claim 1 further characterized in that said sulfite comprises a material selected from the group consisting of sodium sulfite and ammonium sulfite or mixtures thereof.

10. The method of claim 9 further characterized in that said polymer sulfonate is selected from the group consisting of alkali metal or ammonium or mixtures thereof sulfonates.

11. The method of claim 10 further characterized in that the polymer sulfonate has an average equivalent molecular weight of from about 400 to about 450 and the hydrocarbon portion of the sulfonate is derived from the polymerization of monomers selected from the group consisting of isobutylene, butene-1, butene-2, or propylene or mixtures thereof.

12. The method of claim 10 further characterized in that the hydrocarbon portion of the sulfonate is derived from the polymerization of a mixture comprising isobutylene, butene-1, and butene-2.

13. The method of claim 9 further characterized in that said polymer sulfonate has an average molecular weight of from about 350–575 with its hydrocarbon portion derived from the polymerization of a mixture comprising isobutylene, butene-1 and butene-2.

14. The method of claim 13 further characterized in that said surfactant comprises from about 8 to about 13 weight percent hydrocarbon oil, from about 47 to about 52 weight percent sulfonate, from about 23 to about 29 weight percent water and less than about 16 weight percent inorganic salts.

15. The method of claim 1 further characterized in that said surfactant constitutes from about 6 weight percent to about 12 weight percent of the solubilized oil-water mixture.

16. The method of claim 1 further characterized in that said surfactant comprises the product of neutralization of polybutene sulfonic acid and a base selected from the group consisting of ammonia, ammonium hydroxide and sodium hydroxide or mixtures thereof.

17. The method of claim 16 further characterized in that said product of neutralization contains water, unsulfonated polybutene and inorganic sulfate and sulfite salts.

* * * * *

UNITED STATES PATENT OFFICE
CERTIFICATE OF CORRECTION

Patent No. 4,089,788    Dated May 16, 1978

Inventor(s) Edward F. McCarthy

It is certified that error appears in the above-identified patent and that said Letters Patent are hereby corrected as shown below:

| Patent Column | Line | |
|---|---|---|
| 2 | 15 | "as conditions" should be --at conditions-- |
| 2 | 44 | "and 2 to 12 mole ethylene mole" should be --and a 2 to 12 mole ethylene oxide-- |
| 3 | 1 | "polymer of" should be --polymer or-- |
| 4 | 4 | "concentration" should be --concentrations-- |
| 7 | 1 | "the mixed" should be --then mixed-- |

Signed and Sealed this

Twenty-first Day of November 1978

[SEAL]

Attest:

RUTH C. MASON
Attesting Officer

DONALD W. BANNER
Commissioner of Patents and Trademarks